June 14, 1966

R. L. WEHRLI 3,255,636

CONTROL MECHANISM

Filed Sept. 28, 1962

INVENTOR.
ROBERT L. WEHRLI

BY *Robert B. Cauden*

HIS ATTORNEY

June 14, 1966  R. L. WEHRLI  3,255,636
CONTROL MECHANISM
Filed Sept. 28, 1962  5 Sheets-Sheet 3

INVENTOR.
ROBERT L. WEHRLI
BY *Robert R Cauder*
HIS ATTORNEY

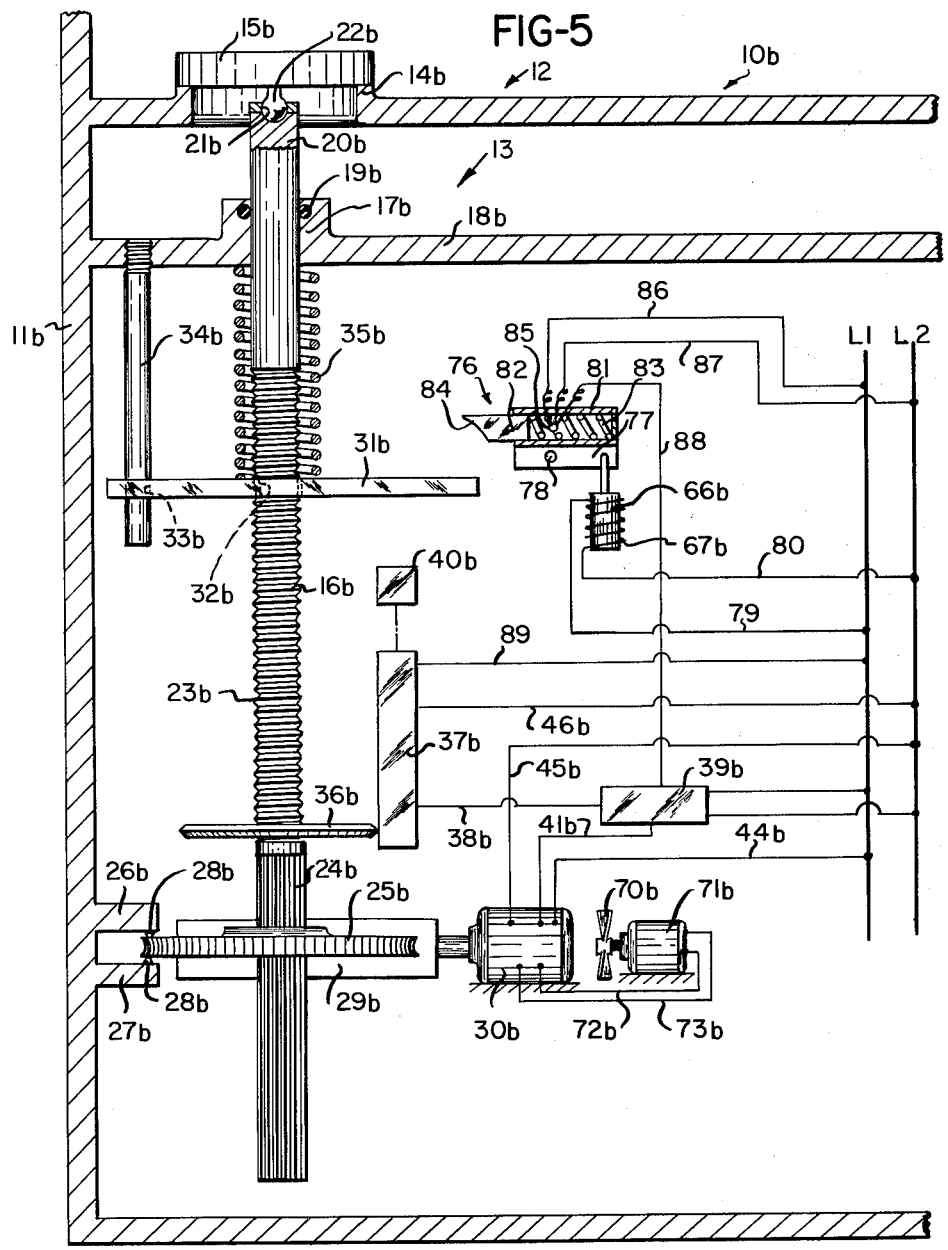

United States Patent Office

3,255,636
Patented June 14, 1966

1

3,255,636
CONTROL MECHANISM
Robert L. Wehrli, Richmond, Va., assignor to Robertshaw Controls Company, Richmond, Va., a corporation of Delaware
Filed Sept. 28, 1962, Ser. No. 226,842
11 Claims. (Cl. 74—2)

This invention relates to an improved means for automatically positioning a shaft or valve stem between the limits of axial movement thereof by suitable power means and for automatically moving the shaft or valve stem to a predetermined position thereof upon a failure of the power means.

In one embodiment of this invention the shaft or valve stem is automatically positioned with electrical power without resorting to intermediate pneumatic or hydraulic cycles.

For example, the shaft or valve stem can be carried by a suitable housing and be axially movable relative thereto, the shaft having a threaded portion and a splined portion splined to a gear rotatably mounted relative to the housing but prevented from moving axially relative thereto.

A threaded collar or member is threadedly disposed on the threaded portion of the shaft and is held from rotational movement by the housing but is permitted to move axially relative thereto.

A compression spring is disposed between the collar and the housing and tends to move the collar in one particular axial direction relative to the housing.

A latching means is carried by the housing and, when in the activated position thereof, tends to prevent movement of the collar in the urged axial direction by the spring means.

A reversible positioning motor is operatively interconnected to the gear splined on the splined portion of the shaft to rotate the shaft in the proper direction under the control of a shaft position sensing means operatively interconnected to the positioning motor.

During initial operation of the apparatus of this invention, a signal is sent to the positioning motor to rotate the shaft in such a direction that the rotating shaft causes the collar to move axially relative to the housing in opposition to the force of the compression spring until the collar is moved beyond the latch means. At this time, the latch means is actuated to prevent the collar from moving in the opposite axial direction under the force of the compression spring.

Thereafter, the shaft position sensing means senses the position of the shaft and sends a signal to the positioning motor to cause the shaft to move in the proper axial direction until the same reaches a selected position.

When the shaft reaches the selected position, the positioning motor is deenergized whereby no excessive electrical power is consumed during idling or nonpositioning cycles of the apparatus of this invention.

However, should it be desired to reposition the valve stem or shaft, the power motor is again energized by the shaft position sensing means to move the shaft to the new position thereof.

Therefore, it can be seen that the shaft or valve stem of this invention is moved to the desired position relative to the housing by having the same rotate relative to the collar which is held in a fixed axial postion thereof.

2

However, should a power failure occur in the power means of this invention, the latch means automatically moves away from the collar whereby the compression spring moves the collar axially and, thus, the shaft axially to a predetermined position whereby the shaft will be disposed in a desired position upon power failure, such feature being a safety feature of the apparatus of this invention.

Therefore, it is an object of this invention to provide an improved apparatus for automatically positioning a shaft or valve stem relative to a housing, the apparatus having one or more of the novel features of this invention set forth above or hereinafter shown or described.

Other objects, uses and advantages of this invention are apparent from a reading of this description which proceeds with reference to the accompanying drawings forming a part thereof and wherein:

FIGURE 5 is a view similar to FIGURE 1 illustrating another embodiment of this invention.

Figure 1:
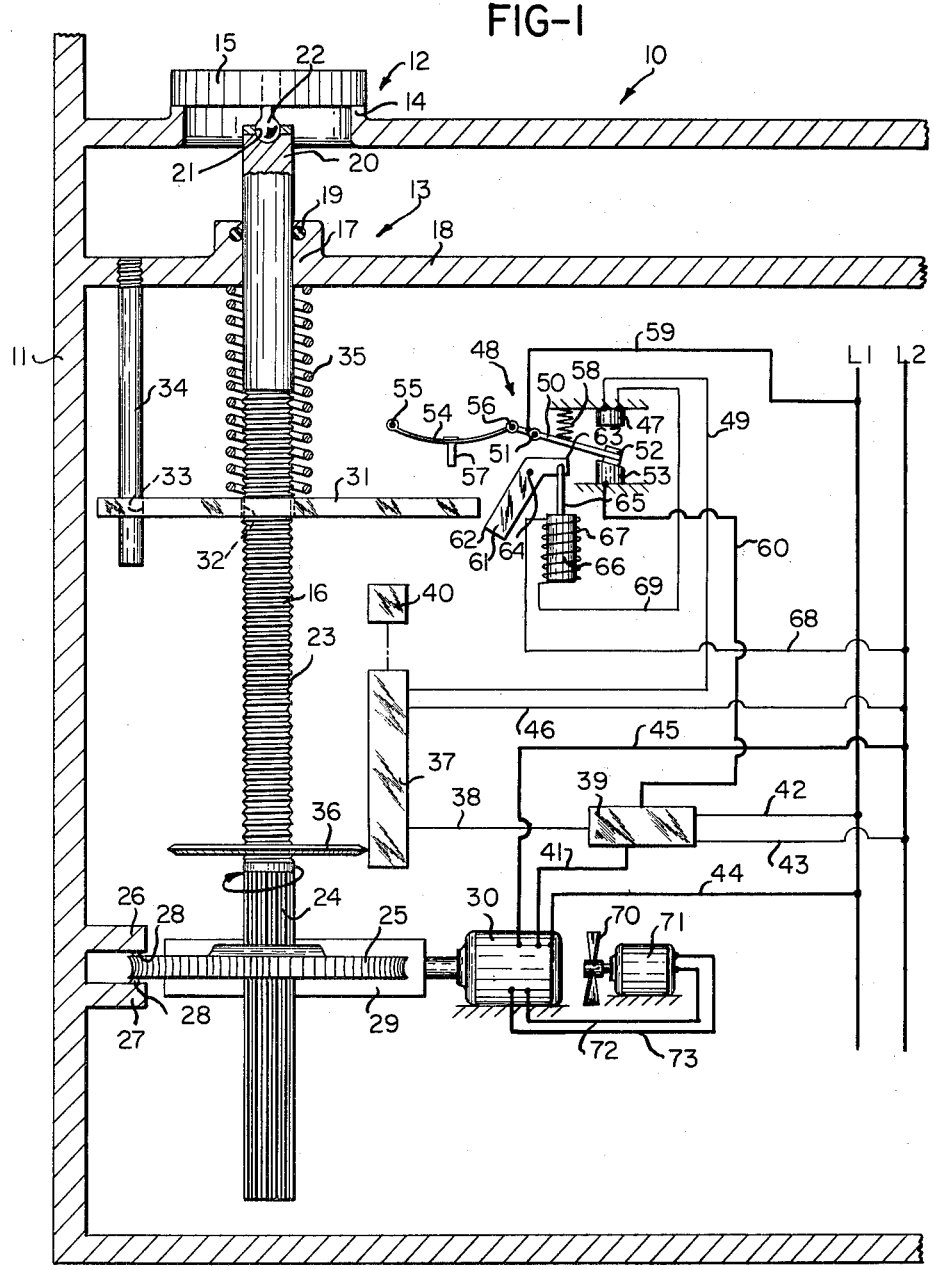
FIGURE 1 is a schematic view of one embodiment of the apparatus of this invention, the apparatus being disposed in one of the operating positions thereof with the actuated electrical leads being shown in heavy lines.

While the various features of this invention are hereinafter described and illustrated as controlling the position of a valve member relative to a valve seat, it is to be understood that the various features of this invention can be utilized singly or in any combination thereof to provide for the proper positioning of devices other than valve members as desired.

Therefore, this invention is not to be limited to only the embodiments illustrated in the drawings, because the drawings are merely utilized to illustrate one of the wide variety of uses of this invention.

Figure 2:
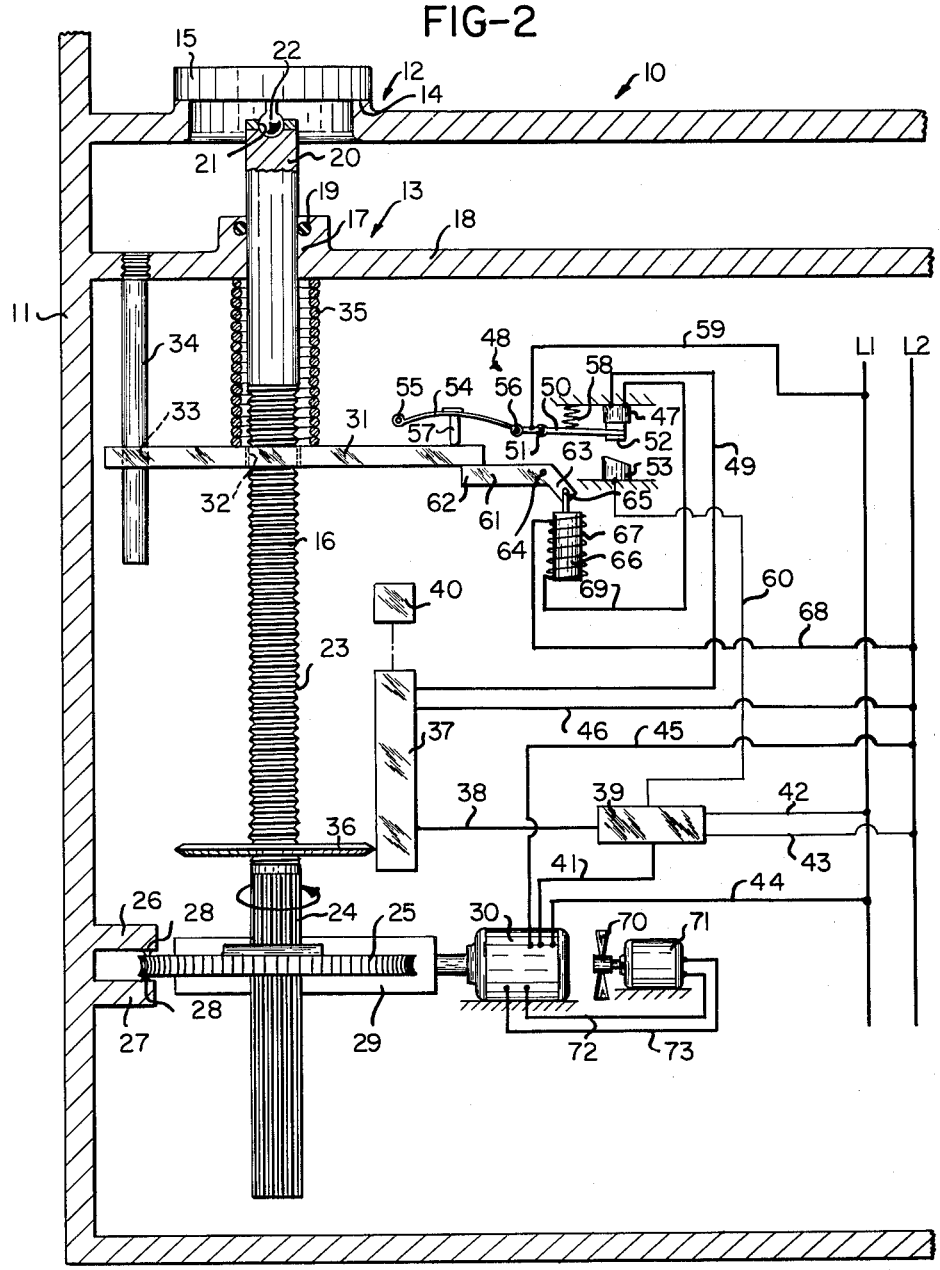
FIGURE 2 is a view similar to FIGURE 1 illusrtating the apparatus of FIGURE 1 in another operating position thereof.
Figure 3:
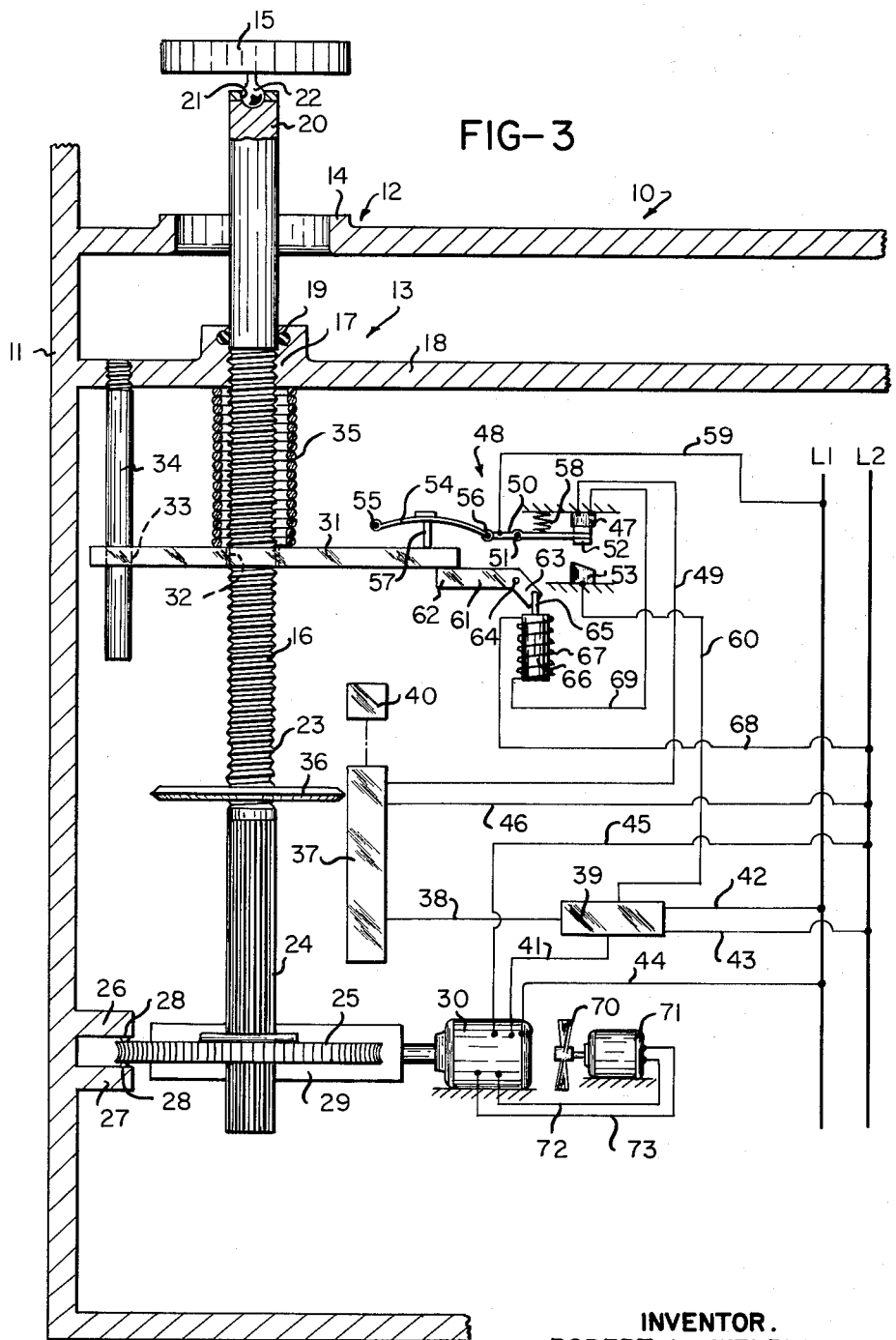
FIGURE 3 is a view similar to FIGURE 1 illustrating the apparatus of FIGURE 1 in another operating position thereof.

Referring now to FIGURES 1-3, one embodiment of the apparatus of this invention is generally indicated by the reference numeral 10 and comprises a housing 11 divided into two chambers 12 and 13 interconnected together by an annular valve seat 14 or the like, the flow of fluid between the chambers 12 and 13 and through the valve seat 14 being controlled by a valve member 15.

The apparatus 10 of this invention is adapted to move the valve member 15 relative to the valve seat 14 to any selected position thereof between its fully opened position and its fully closed position and to automatically change that selected position as desired either manually or automatically.

Further, should the valve member 15 be moved to a particular open position thereof and a failure occurs in the power means of this invention, means are provided to automatically move the valve member 15 to a predetermined safe position thereof, which, in the embodiment illustrated in FIGURES 1-3, is a fully closed position.

The structure for effecting the above movements of the valve member 15 will now be described.

As illustrated in FIGURES 1-3, a shaft or valve stem 16 is carried by the housing 11 and is adapted to move axially relative thereto in a bearing means 17 carried by a wall 18 of the housing 11, suitable sealing means 19 being provided between the bearing means 17 and the shaft 16.

The shaft or valve stem 16 has an end 20 provided with a ball socket 21 receiving a ball portion 22 of the valve member 15 whereby the shaft 16 is operatively connected to the valve member 15 to axially move the valve member 15 relative to the valve seat 14 upon axial movement of the shaft 16 while the ball connection 21, 22 permits the shaft 16 to rotate relative to the valve member 15 for a purpose hereinafter described.

The shaft 16 has an externally threaded portion 23 and a longitudinally serrated or splined portion 24 for a purpose hereinafter described.

A gear 25 is splined on the splined end 24 of the shaft 16 and is prevented from axial movement by the housing 11 in any suitable manner.

For example, the housing 11 can have flange portions 26 and 27 disposed on opposite sides of the gear 25 to carry bearing means 28 engaging the gear 25 to permit rotational movement of the gear 25 but not axial movement thereof.

The gear 25 is disposed in meshing relation with a worm gear 29 adapted to be rotated by a reversible electric motor 30 in a manner hereinafter described.

A collar, disc or other suitable member 31 has an internally threaded aperture 32 passing therethrough and threadedly receiving the threaded portion 23 of the shaft 16.

The collar 31 has a smooth off center bore 33 passing therethrough and receiving a rod 34 depending from the wall 18 of the housing 11.

In this manner, the collar 31 is adapted to be moved axially relative to the housing 11 in a manner hereinafter described but is prevented from rotating relative thereto by the rod 34 when the shaft 16 is rotated by the motor means 30.

A compression spring 35 is disposed around the shaft 16 and has one end engaging the wall 18 of the housing 11 and the other end thereof engaging the collar 31 whereby the spring 35 normally tends to urge the collar 31 axially downwardly relative to the housing 11 until the valve member 15 is seated on the valve seat 14 and prevents further downward axial movement of the collar 31 and shaft 16.

The shaft 16 carries a position indicating disc 36 or the like fixed to the shaft 16 intermediate the threaded portion 23 and splined portion 24 thereof, the indicator 36 being adapted to be sensed by a shaft position sensing means 37.

The shaft position sensing means 37 is adapted to sense the axial position of the shaft 16 by sensing the location of the disc 36 relative to the means 37 and is also adapted to send a signal through a cable 38 to an amplifier 39 should the shaft 16 be in an axial position other than a selected axial position, the sensing means 37 being a well known sensing means and readily available on the market.

The shaft position sensing means 37 is adapted to be either manually or automatically adjusted to require the shaft 16 to be in any selected axial position thereof between the limits of axial movement of the shaft 16.

For example, the selected axial position of the shaft 16 can be varied automatically by means 40 operatively interconnected to the position sensing means 37.

While the means 40 can automatically change the selected position of the position sensing means 37 in any suitable manner and for any suitable purpose, one embodiment thereof would be a temperature sensing means sensing the temperature effect of a burner interconnected to the apparatus 10 and being supplied fuel through the valve seat 14 of the housing 10, the chamber 13 being interconnected to a source of fuel and the chamber 12 being interconnected to the burner.

Thus, should the valve member 15 be closed and the temperature sensing means 40 require that fuel flow to the burner means at a particular rate, the temperature sensing means 40 requires the shaft position sensing means 37 to sense a particular axial position of the shaft 16 relative to the housing 11 which would require the valve member 15 to be in a selected open position thereof.

However, because the indicator 36, sensed by the sensing means 37, indicates that the valve member 15 is closed, the sensing means 37 sends a signal through the cable 38 to the amplifier 39, the signal being amplified in the amplifier 39 and being directed by a cable 41 to the electric motor 30 to cause the motor 30 to axially move the shaft 16 in a manner hereinafter described until the valve member 15 has been moved to the desired open position thereof.

Thereafter, should the temperature sensing means 40 require that the valve member 15 be closed or be moved to a more closed position thereof, the same changes the selected position of the position sensing means 37 to require the same to send a signal to the motor 30 to again change the axial position of the shaft 16.

The amplifier 39 is interconnected to power lines $L_1$ and $L_2$ of a suitable power source by leads 42 and 43.

Similarly, the electrical motor 30 is interconnected to the power source leads $L_1$ and $L_2$ by leads 44 and 45.

However, suitable switching mechanism is provided in the motor 30 to prevent completion of the circuit between the leads 44 and 45 thereof until the switch mechanism is suitable actuated by a signal delivered thereto by the amplifier 39 through the cable 41.

For example, the amplifier 39 may send a signal through the cable 41 to the motor 30 to interconnect the leads 44 and 45 in such a manner that the motor 30 will rotate in one direction.

At other times, the amplifier 39 may send a signal through the cable 41 to interconnect together the leads 44 and 45 to operate the motor 30 in the other direction thereof as will be apparent hereinafter.

The shaft position sensing means 37 has one side thereof interconnected to the lead $L_2$ of the electrical power source by a lead 46, the other side of the position sensing means 37 being interconnected to a fixed contact 47 of a switching means 48 by a lead 49.

The switching means 48 includes a switch arm 50 pivotally mounted between its ends at a point 51 and carrying contact means 52 adapted to move between the fixed contact 47 and another fixed contact 53.

While any suitable mechanism can be utilized to snap the switch arm 50 between the fixed contacts 47 and 53, one embodiment is illustrated in the drawing and comprises a snap action spring 54 having one end 55 thereof fixed and the other end 56 thereof secured to the end of the switch arm 50, the snap action spring 54 carrying a fixed plunger 57 adapted to be engaged by the collar 31 in a manner hereinafter described.

The snap action member 54 is normally disposed in the position illustrated in FIGURE 1 whereby the same, in combination with a compression spring 58, causes the switch arm 50 to have the contact means 52 thereof normally disposed against the fixed contact 53.

However, upon upward movement of the plunger 57 from the position illustrated in FIGURE 1 to the position illustrated in FIGURE 2, the snap action member 54 subsequently snaps over center to cause the switch arm 50 to pivot about the point 51 in opposition to the force of the compression spring 58 and move the contact means 52 thereof into engagement with the contact means 47 for a purpose hereinafter described.

The switch arm 50 is an electrical conductor and is interconnected to the power lead $L_1$ by a lead 59.

The fixed contact 53 of the switch mechanism 48 is interconnected to the amplifier 39 by a lead 60 whereby the contact means 52 of the switch arm 50 sends a signal to the amplifier 39 through the lead 60 when the switch arm 50 is disposed in the position illustrated in FIGURE 1, the amplifier 39 converting the signal from the lead 60 to the cable 41 to operate the motor 30 to rotate the gear 29 in a particular direction thereof.

However, when the switch arm 50 is moved from the position illustrated in FIGURE 1 to the position illustrated in FIGURE 2 to have the contact means 52 thereof moved against the fixed contact means 47, it can be seen that the shaft position sensing means 37 is placed across the leads $L_1$ and $L_2$ to permit the shaft position sensing means 37 to determine the position of the shaft 16, and if the shaft 16 is out of register with a selected axial position, the means 37 sends such signal through the cable 38 to the amplifier 39, the amplifier 39 no longer receiving the signal from the lead 60 as the contact 52 of the switch arm 50 is out of contact with the fixed contact 53.

A latching means or member 61 is carried by the housing 11 and is pivotally mounted intermediate its ends 62 and 63 at a pivot point 64.

The end 63 of the latch member 61 is interconnected to a rod 65 of a solenoid 66 which, when deenergized, causes the latch member 61 to pivot about the pivot point 64 to the position illustrated in FIGURE 1 whereby the end 62 of the latch member 61 does not prevent axial movement of the collar 31 for a purpose hereinafter described.

The coil 67 of the solenoid 66 has one end thereof interconnected to the power lead $L_2$ by a lead 68 while the other side of the coil 67 is interconnected to the fixed contact 47 of the switch mechanism 48 by a lead 69.

Therefore, it can be seen that the solenoid 66 is only energized when the contact means 52 of the switch arm 50 is disposed in contact with the fixed contact 47 of the switch mechanism 48.

When the solenoid 66 is energized in the above manner, the rod 65 is pulled downwardly to cause the latch member 61 to pivot about the pivot point 64 to the position illustrated in FIGURE 2 whereby the end 62 thereof prevents downward axial movement of the collar 31 under the force of the compression spring 35 for a purpose hereinafter described.

Should the motor 30 utilized for controlling the axial position of the shaft or valve stem 16 be disposed in the housing 11, as illustrated in the drawings, it may be required to provide cooling means for the motor 30, such as air cooling or other fluid cooling means.

Therefore, a suitable air fan 70 is provided adjacent the motor 30 and is adapted to be driven by a motor 71 interconnected to the motor 30 by leads 72 and 73 whereby the fan motor 71 is only energized when the motor 30 is energized.

In this manner, the fan motor 71 will only tend to cool the motor 30 when the same is operating as it may be found that the motor 30 only operates for very short periods of time.

The operation of the apparatus 10 of this invention will now be described.

Assuming that the collar 31 is disposed in the position illustrated in FIGURE 1 whereby the switch arm 50 has the contact means 52 thereof disposed against the fixed contact means 53 of the switch mechanism 48 by the force of the compression spring 58 and the natural position of the snap action spring 54, and assuming that it is required that the apparatus 10 be turned over to the control of the shaft position sensing means 37, a suitable electrical power source is interconnected to the power leads $L_1$ and $L_2$ by any suitable switch mechanism (not shown).

As illustrated in FIGURE 1, when current flows through the leads $L_1$ and $L_2$, current flows from the line $L_1$ through the lead 59, switch arm 50, contact means 52 and 53 and lead 60 to the amplifier 39 and back through the lead 43 to power lead $L_2$ to deliver a signal to the amplifier 39 indicating that the collar 31 has been moved axially downwardly to its lowest position by the compression spring 35 whereby the valve member 15 is disposed against the valve seat 14 preventing fluid communication between the compartments 12 and 13 of the housing 11.

The amplifier 39 senses such signal from the lead 60 in a suitable manner to send a signal through the cable 41 to the motor 30 to interconnect the leads 44 and 45 thereof in such a manner that the motor 30 causes the gear 25 to rotate the shaft 16 in the direction indicated by the arrow, such rotation of the shaft 16 tending to cause the shaft 16 to move downwardly relative to the collar 31.

However, because the shaft 16 cannot move axially downwardly from the position illustrated in FIGURE 1, as the valve member 15 is engaging the valve seat 14, such rotational movement of the shaft 16 causes the collar 31 to move axially upwardly in opposition to the force of the compression spring 35.

As the shaft 16 is being so rotated, the shaft 16 is adapted to rotate relative to the valve member 15 by the ball and socket connection 21, 22 whereby the valve member 15 will not be rotated against the valve seat 14 to be worn out thereby.

As the collar 31 is driven axially upwardly by the rotating shaft 16, the collar 31 comes into engagement with the plunger 57 of the switch mechanism 48 and moves the plunger 57 upwardly therewith.

When the plunger 57 has been moved upwardly a sufficient distance by the upwardly moving collar 31, the snap action member 54 snaps over center to the position illustrated in FIGURE 2 whereby the switch arm 50 pivots about the pivot point 51 to move the contact means 52 thereof out of contact with the contact 53 and into contact with the contact 47.

When the contact 52 moves away from the contact 53, the previous signal to the amplifier 39 through the lead 60 is terminated whereby the amplifier 39 terminates operation of the motor 30.

Simultaneously with the movement of the contact 52 into contact with the contact 47, the solenoid coil 67 of the solenoid 66 is placed across the power leads $L_1$ and $L_2$ whereby the solenoid 66 is energized to cause the latch member 61 to pivot about the point 64 and bring the end 62 thereof into engagement with the under side of the collar 31 whereby the latch means 61 will hold the collar 31 in the position illustrated in FIGURE 2 even though the valve member 15 and shaft 16 are moved axially upwardly in a manner hereinafter described.

Also, when the contact means 52 of the switch arm 50 is disposed in engagement with the fixed contact 47 of the switch mechanism 48, the shaft position sensing means 37 is placed across the power leads $L_1$ and $L_2$ whereby the shaft position sensing means 37 is adapted to operate in a manner now to be described.

With the apparatus 10 now disposed in the position illustrated in FIGURE 2, the temperature sensing means 40 may send a signal to the shaft position sensing means 37 to require the same to have the shaft 16 moved axially upwardly to fully open the valve member 15.

However, because the position indicator 36 is at the bottom of its travel thereof, the shaft position sensing means 37 sends a signal through the cable 38 to the amplifier 39, the signal being sensed by the amplifier 39 as a demand to move the shaft 16 axially upwardly.

Therefore, the amplifier 39 sends a signal through the cable 41 to the motor 30 to cause the motor 30 to rotate the gear 25 in such a direction to rotate the shaft 16 in the direction indicated by the arrow in FIGURE 2.

As the shaft 16 rotates in the direction indicated in FIGURE 2, the shaft, through its threaded connection with the collar 31, progressively moves axially upwardly relative to the collar 31 to carry the valve member 15 axially upwardly relative to the valve seat 14 until the position indicator 36, carried by the shaft 16, is sensed in the proper position by the shaft position sensing means 37 as illustrated in FIGURE 3.

When the shaft 16 has been axially moved upwardly to the selected position thereof, the position sensing means 37 terminates its signal to the amplifier 39 whereby the amplifier 39 terminates operation of the motor 30 so that the shaft 16 remains in the position illustrated in FIGURE 3 until the temperature sensing means 40 requires the valve member 15 to be disposed in another position thereof.

For example, should the temperature sensing means 40 require that the valve member 15 now be moved to a position closer to the valve seat 14, the shaft position sensing means 37 again sends a signal to the amplifier 39 through the cable 38 which is sensed as demand on the amplifier 39 to cause the motor 30 to operate in a direction to cause the shaft 16 to move axially downwardly to the new position.

Therefore, it can be seen that the shaft position sensing means 37, under the influence of the temperature sensing means 40, is adapted to move the valve member 15 to any position thereof between and including its fully closed and fully opened positions thereof and is adapted to maintain the valve member in any selected position to provide for the proper flow of fuel through the valve seat 14.

However, should the valve member 15 be disposed in one of its open positions thereof and a power failure occurs without the safety feature of this invention, the valve member 15 would remain at its particular open position and permit fuel to continuously flow through the valve seat 14 even though the temperature sensing means 40 would be requiring that the valve member 15 be fully closed.

To avoid this dangerous situation should a power failure occur during operation of the apparatus 10 while the valve member 15 is disposed in an open position thereof, the solenoid 66 will be deenergized by such power failure whereby the latch member 61 will be caused to pivot about the pivot point 64 to the position illustrated in FIGURE 1 so that the force of the compression spring 35 will cause the collar 31 to move axially downwardly past the latch member 61.

Because the collar 31 is threaded to the shaft 16, such downward axial movement of the collar 31 will effect like axial movement of the shaft 16 to carry the valve member 15 downwardly until the same rests on the valve seat 14 and closes the same, the seating valve member 15 preventing further downward axial movement of the collar 31 and shaft 16.

Therefore, it can be seen that the safety feature of the apparatus 10 automatically causes the valve member 15 to be returned to its fully closed position should a power failure occur in the power means of this invention.

After the power failure has occurred and the collar 31 has been moved axially downwardly by the spring 35 until the valve member 15 is disposed in its closed position against the valve seat 14, a subsequent re-occurrence in the power to the power means of this invention causes the collar 31 to again be moved upwardly from the position illustrated in FIGURE 1 to the position illustrated in FIGURE 2 to permit the shaft position sensing means 37 to again take over operation of controlling the position of the shaft 16 relative to the housing 11 in the manner previously described.

While the embodiment of the apparatus 10 illustrated in FIGURES 1–3 has the valve member 15 moved to its fully closed position upon a power failure, it is to be understood that the same could be moved to its fully opened position upon a power failure, if desired.

Figure 4:
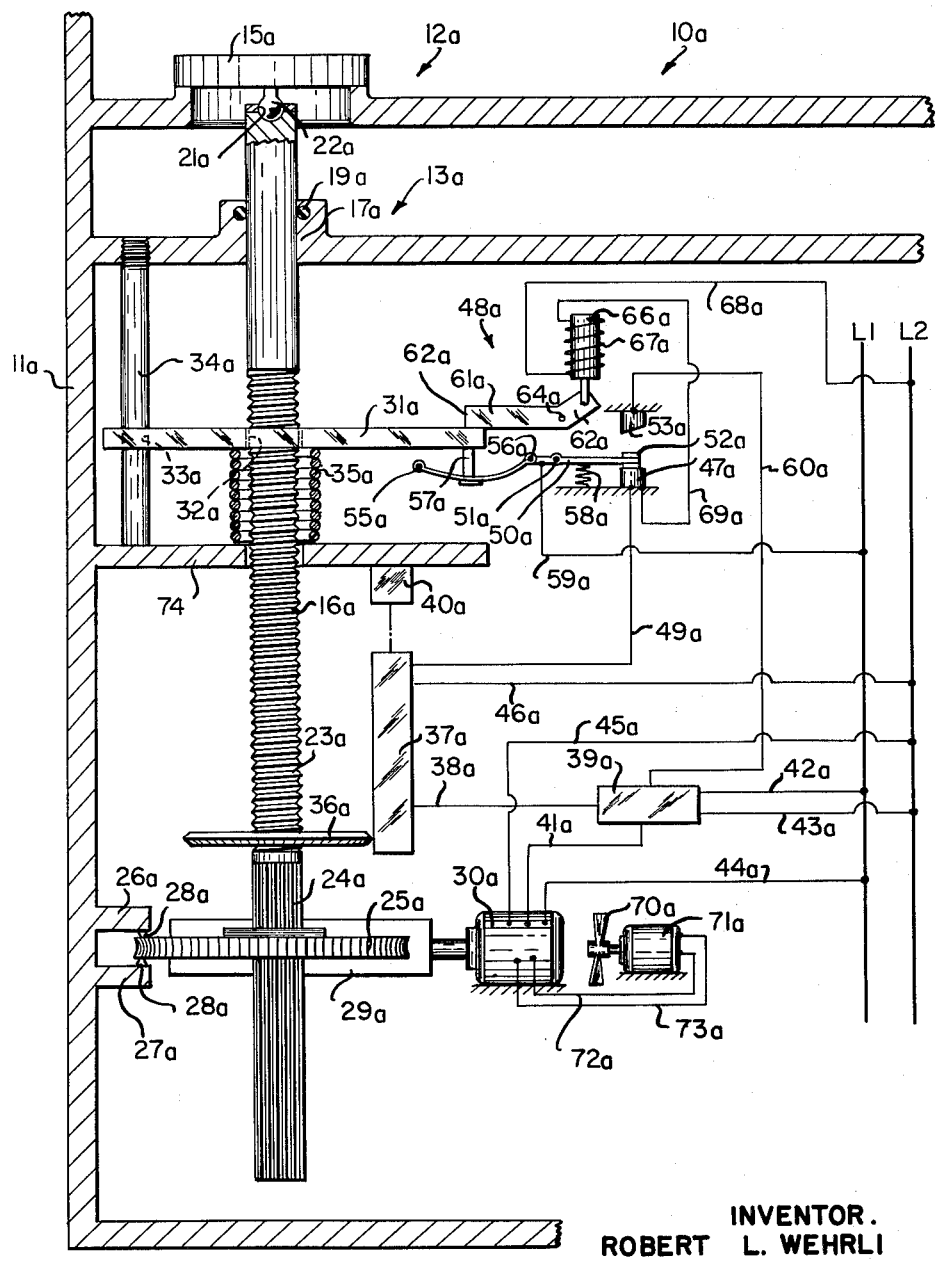
FIGURE 4 is a view similar to FIGURE 1 illustrating another embodiment of this invention.

For example, reference is made to FIGURE 4 wherein another apparatus of this invention is generally indicated by the reference numeral 10a and parts thereof similar to the apparatus 10 previously described are indicated by like reference numerals followed by the reference letter "a."

As illustrated in FIGURE 4, substantially the same mechanism is provided for the apparatus 10a as is provided for the apparatus 10 previously described except that the position of the latch means 61a and switch mechanism 48a are reversed, the compression spring 35a being disposed between the collar 31a and a wall 74 of the housing 11a disposed below the collar 31a.

Thus, should a power failure occur when the valve member 15a is disposed in its closed position or in any of its opened positions other than its fully opened position, the latch member 61a is pivoted away from the collar 31a to permit the compression spring 35a to axially move the collar 31a and shaft 16a axially upwardly relative to the housing 11a until the valve member 15a abuts the wall 75 of the housing 11, the valve member 15a abutting the wall 75 when the valve member 15a is disposed in its fully opened position.

After a resumption of the electrical power occurs, the lead 50a carries a signal to the amplifier 39a to cause the motor 30a to rotate the shaft 16a in a direction tending to move the shaft 16a axially upwardly.

However, because the valve member 15a is pressing against the wall 75, the collar 31a is moved axially downwardly by the rotating shaft 16a to compress the spring 35a between the collar 31a and the wall 74.

As the collar 31a moves axially downwardly, the same snaps over the snap member 54a to cause the switch arm 50a to terminate the signal to the amplifier 39a and interconnect the position sensing means 37a across the power leads $L_1$ and $L_2$ for the purpose previously described whereby the position sensing means 37 then controls the proper position of the valve member 15a relative to valve seat 14a in the manner previously described.

Therefore, it can be seen that this invention provides a safety feature for returning the valve member to either its fully closed or its fully opened position upon a failure of power to the power means while permitting the valve member to be normally moved to any one of its operating positions when there is no power failure.

Another apparatus of this invention is generally indicated by the reference numeral 10b in FIGURE 5 and parts thereof similar to the apparatus 10 previously described are indicated by like reference numerals followed by the reference letter "b."

In the apparatus 10b, substantially the same structure is provided as is provided in the apparatus 10 previously described except that the latch mechanism 61 and switch mechanism 48 of the apparatus 10 has been eliminated.

In place thereof, a latch mechanism 76 is provided and comprises a latch member 77 pivotally mounted at 78 and normally disposed in the position illustrated in FIGURE 5 by the solenoid 66b, the solenoid 66b having the coil 67b thereof continuously placed across the power leads $L_1$ and $L_2$ by leads 79 and 80.

Therefore, as long as electrical power is supplied to the leads $L_1$ and $L_2$, the latch member 77 is held in the position illustrated in FIGURE 5.

However, should a power failure occur, the latch member 77 is pivoted about the pivot point 78 to move the latch member 77 out of the path of axial travel of the collar 31b.

The latch member 77 includes a tubular member 81 receiving a latch plunger 82 normally urged to the left by a compression spring 83, the latch plunger 82 having an angled cam surface 84 for a purpose hereinafter described.

A suitable relay 85 is provided in the latch member 77 and it is interconnected to the power leads $L_1$ and $L_2$ by leads 86 and 87.

The relay 85 is adapted to send a signal in a manner hereinafter described through a lead 88 to the amplifier 39b for a purpose hereinafter described.

Further, the shaft position sensing means 37b is directly interconnected to the leads $L_1$ and $L_2$ by leads 89 and 46b.

The operation of the apparatus 10b will now be described.

Assuming that the collar 31b is disposed in the position illustrated in FIGURE 5 and the power leads L₁ and L₂ are interconnected to a suitable power source, the solenoid 66b is actuated whereby the latch member 77 is disposed in the position illustrated in FIGURE 5.

Further, the shaft position sensing means 37b is placed across the leads L₁ and L₂ so that the same senses the position of the shaft indicator 36b.

As long as the temperature sensing means 40b requires that the valve member 15b be disposed in the closed position thereof, no change takes place in the apparatus 10b from the position illustrated in FIGURE 5.

However, should the temperature sensing means 40b require that the valve member 15b be moved to an open position thereof, the shaft position sensing means 37b sends a signal to the amplifier 39b through the cable 38b demanding that the shaft 16b be moved axially upwardly.

However, because the amplifier 39b is also receiving a signal through the lead 88 from the relay 85, the amplifier 39b senses the two signals from the cables 38b and 88 as a demand to cause the motor 30b to rotate the shaft 16b in a direction to cause the collar 31b to be moved axially upwardly in the manner previously described.

As the collar 31b is being driven axially upwardly, the same comes into contact with the camming surface 84 of the latch plunger 82 and cams the same to the right in opposition to the force of the compression spring 83 until the collar 31b clears the latch plunger 82 to permit the plunger 82 to be moved back to the left by the force of the compression spring 83 below the collar 31b in its new position thereof.

At the same time that the plunger 82 moves back to the left under the collar 31b, the plunger 82 actuates the relay 85 to terminate the signal through the cable 88 to the amplifier 39b.

When the signal through the cable 88 is terminated in the above manner, the amplifier 39b then properly senses the signal from the shaft position sensing means 37b as a demand to cause the motor 30b to operate in the opposite direction to cause rotation of the shaft 16b in the opposite direction and move the valve member 15b axially upwardly to the desired open position thereof.

When the valve member 15b is in its opened position and a power failure occurs, the latch member 77 is pivoted about the pivot point 78 to permit the collar 31b to be moved axially downwardly by the compression spring 35b to close the valve member 15b against the valve seat 14b in the manner previously described.

When the latch member 77 has been pivoted about the pivot point 78 to permit the collar 31b to be axially moved downwardly in the above manner, the same resets the relay 85 so that upon a resumption of the power, the relay 85 will again send a signal through the cable 88 to the amplifier 39b until the relay 85 is again tripped by the collar 31b being moved back up to its latched position in the manner previously described.

Therefore, it can be seen that the apparatus illustrated in FIGURE 5 functions in a manner substantially the same as the other apparatus of this invention except that the switch mechanism 48 has been eliminated.

Accordingly, the various apparatus of this invention each provides improved means for controlling the axial position of a shaft or valve member relative to a housing between the limits of movement thereof and for selectively changing the position of the shaft or valve member as desired.

Further, the various apparatus of this invention each permits the shaft or valve member to be moved to a predetermined position thereof upon the power failure of the power means of this invention to provide a safety feature for the apparatus of this invention.

While the form of the invention now preferred has been disclosed as required by the statutes, other forms may be used, all coming within the scope of the claims which follow.

What is claimed is:

1. In combination, a housing, a shaft carried by said housing and being axially movable relative thereto, said shaft having a threaded portion, a threaded member carried by said housing and always being disposed in threaded relation with said threaded portion of said shaft, power means for rotating said shaft in the desired direction to cause said shaft to be axially moved relative to said threaded member to any selected axial position thereof between the limits of axial movement of said shaft, and means for axially moving in unison said threaded member and said shaft relative to said housing to a predetermined axial position thereof upon failure of said power means.

2. A combination as set forth in claim 1 and including means operatively interconnected to said power means to vary the selected position of said shaft.

3. A combination as set forth in claim 1 wherein said power means is adapted to return said shaft to said selected axial position thereof upon reactivation of said power means.

4. In a combination, a housing, a shaft carried by said housing and being axially movable relative thereto, said shaft having a threaded portion and a splined portion, a threaded member carried by said housing and always being disposed in threaded relation with said threaded portion of said shaft, drive means carried by said housing and being disposed in splined relation with said splined portion of said shaft, power means for rotating said drive means in the desired direction to cause said shaft to be moved axially relative to said threaded member to any selected axial position thereof between the limits of axial movement of said shaft, and means for axially moving in unison said threaded member and said shaft relative to said housing to a predetermined axial position thereof upon failure of said power means.

5. A combination as set forth in claim 4 and including means operatively interconnected to said power means to vary the selected position of said shaft.

6. A combination as set forth in claim 4 wherein said power means is adapted to return said shaft to said selected axial position thereof upon reactivation of said power means.

7. A combination as set forth in claim 4, wherein said threaded member is adapted to move axially relative to said housing and is prevented from rotating relative thereto.

8. In combination, a housing, a shaft carried by said housing and being axially movable relative thereto, said shaft having a threaded portion, a threaded member carried by said housing and always being disposed in threaded relation with said threaded portion of said shaft, said threaded member being axially movable relative to said housing and being prevented from rotating relative thereto, spring means disposed between said housing and said threaded member to tend to move said threaded member in one axial direction, latch means carried by said housing for normally preventing movement of said threaded member in said one axial direction, power means for rotating said shaft in the desired direction to cause said shaft to be axially moved relative to said threaded member to any selected position thereof, and means for moving said latch means away from said threaded member upon failure of said power means to cause said spring means to axially move in unison said threaded member and said shaft relative to said housing in said one axial direction to move said shaft to a predetermined position thereof.

9. A combination as set forth in claim 8 and including means operatively interconnected to said power means to vary the selected position of said shaft.

10. A combination as set forth in claim 8 wherein said power means is adapted to rotate said shaft in the proper direction to axially move said threaded member in opposition to said spring means back to its normal position to be latched by said latching means upon reactivation of said power means, said power means thereafter being adapted to return said shaft to said selected axial position thereof.

11. A combination as set forth in claim 10 wherein said latch means is only moved back to its normal latching position when said threaded member is returned to its normal position and said power means is not adapted to return said shaft to its selected axial position until said threaded member is back at its normal position.

References Cited by the Examiner
UNITED STATES PATENTS

| | | | |
|---|---|---|---|
| 2,276,195 | 3/1942 | Holmes | 251—134 X |
| 2,301,876 | 11/1942 | Hurlburt | 251—69 |
| 2,470,470 | 5/1945 | Carbon | 251—133 X |
| 2,598,062 | 5/1952 | Krecan | 251—134 |
| 2,839,929 | 6/1958 | Hurlburt | 251—69 |
| 2,930,571 | 3/1960 | Vogel | 251—69 |

M. CARY NELSON, *Primary Examiner.*

J. DEATON, L. KAMPSCHOROR, A. ROSENTHAL,
*Assistant Examiners.*